(12) United States Patent
Bozdech et al.

(10) Patent No.: US 10,697,151 B2
(45) Date of Patent: Jun. 30, 2020

(54) METHOD OF CONTROLLING A WORK MACHINE ACCORDING TO A DRIVETRAIN LOAD-ADJUSTED ECONOMY MODE AND CONTROL SYSTEM THEREOF

(71) Applicant: DEERE & COMPANY, Moline, IL (US)

(72) Inventors: George W. Bozdech, East Dubuque, IL (US); Christopher R. Benson, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 245 days.

(21) Appl. No.: 15/967,779

(22) Filed: May 1, 2018

(65) Prior Publication Data

US 2019/0338496 A1 Nov. 7, 2019

(51) Int. Cl.
| | |
|---|---|
| *E02F 9/22* | (2006.01) |
| *E02F 9/20* | (2006.01) |
| *B60W 10/06* | (2006.01) |
| *B60W 10/103* | (2012.01) |
| *B60W 30/182* | (2020.01) |
| *E02F 3/84* | (2006.01) |

(52) U.S. Cl.
CPC ........... *E02F 9/2253* (2013.01); *B60W 10/06* (2013.01); *B60W 10/103* (2013.01); *B60W 30/182* (2013.01); *E02F 9/2025* (2013.01); *B60W 2510/0604* (2013.01); *B60W 2510/1005* (2013.01); *B60W 2510/1085* (2013.01); *B60W 2520/10* (2013.01); *B60W 2710/0605* (2013.01); *B60W 2710/1005* (2013.01); *E02F 3/84* (2013.01)

(58) Field of Classification Search
CPC combination set(s) only.
See application file for complete search history.

(56) References Cited

U.S. PATENT DOCUMENTS

| | | | |
|---|---|---|---|
| 5,875,854 A | 3/1999 | Yamamoto et al. | |
| 6,181,999 B1 | 1/2001 | Yamamoto et al. | |
| 7,854,681 B2 | 12/2010 | Sopko et al. | |
| 8,214,097 B2 * | 7/2012 | Severinsky | B60L 58/10 701/22 |
| 8,406,963 B2 | 3/2013 | Farmer et al. | |
| 8,532,888 B2 | 9/2013 | Ishibashi et al. | |
| 8,538,645 B2 | 9/2013 | Anderson et al. | |
| 8,548,690 B2 | 10/2013 | Hayashi | |
| 8,548,691 B2 | 10/2013 | Hayashi et al. | |

(Continued)

*Primary Examiner* — Hussein Elchanti
(74) *Attorney, Agent, or Firm* — Taft Stettinius & Hollister LLP; Stephen F. Rost

(57) ABSTRACT

A method of selecting an economy operating mode of a work machine includes detecting a current throttle position of a throttle control and a current track speed with a speed sensor, and determining a current drivetrain load of the machine as a function of motor torque, a drivetrain ratio, a drivetrain mechanical efficiency, a final drive windage factor, and a rolling radius. The method includes decreasing the current throttle command if a ratio of the current drivetrain load to an available drivetrain load is less than a load threshold. A transmission ratio of the transmission is increased by the controller to an increased transmission ratio if the ratio of the current drivetrain load to the available drivetrain load is less than the load threshold.

20 Claims, 4 Drawing Sheets

(56) References Cited

U.S. PATENT DOCUMENTS

| | | |
|---|---|---|
| 8,649,944 B2 | 2/2014 | Hayashi et al. |
| 8,655,556 B2 | 2/2014 | Hayashi et al. |
| 8,700,273 B2 | 4/2014 | Farmer et al. |
| 8,731,784 B2 | 5/2014 | Hayashi et al. |
| 8,762,010 B2 | 6/2014 | Farmer et al. |
| 8,770,307 B2 | 7/2014 | Hayashi et al. |
| 8,924,095 B2 | 12/2014 | Fehr et al. |
| 8,948,977 B2 | 2/2015 | Liu et al. |
| 2004/0209718 A1* | 10/2004 | Ishibashi ............ B60W 10/103 474/18 |
| 2005/0211528 A1* | 9/2005 | Hou ................ B60W 30/1888 192/85.63 |
| 2007/0101818 A1* | 5/2007 | Kabrich ............... F16H 61/061 74/335 |
| 2007/0144175 A1* | 6/2007 | Sopko, Jr. ............... F02D 23/02 60/605.1 |
| 2010/0082192 A1* | 4/2010 | Hofbauer ................ B60K 5/08 701/22 |
| 2010/0293913 A1* | 11/2010 | Mackin ................ A01D 43/105 56/10.2 R |
| 2011/0153170 A1 | 6/2011 | Dishman et al. |
| 2011/0204712 A1* | 8/2011 | Tarasinski ............. A01B 59/06 307/9.1 |
| 2012/0265389 A1* | 10/2012 | Bissontz .................. B60K 6/48 701/22 |
| 2013/0025949 A1* | 1/2013 | Momal .................... B60K 6/38 180/53.8 |
| 2013/0158818 A1 | 6/2013 | Callaway |
| 2013/0158819 A1 | 6/2013 | Callaway |
| 2013/0245896 A1* | 9/2013 | Velde ....................... G06F 17/00 701/50 |
| 2014/0230785 A1* | 8/2014 | Kawaguchi ............. F02D 29/04 123/349 |
| 2014/0257646 A1 | 9/2014 | Ishibashi et al. |
| 2015/0019086 A1 | 1/2015 | Hayashi et al. |
| 2015/0197239 A1* | 7/2015 | Vilar ........................ B60K 6/46 477/5 |

* cited by examiner

US 10,697,151 B2

METHOD OF CONTROLLING A WORK MACHINE ACCORDING TO A DRIVETRAIN LOAD-ADJUSTED ECONOMY MODE AND CONTROL SYSTEM THEREOF

FIELD OF THE DISCLOSURE

The present disclosure relates to a work machine, and in particular, to a method of controlling a work machine to operate in accordance with an economy operating mode.

BACKGROUND

Construction machines, such as a motor grader or crawler, may operate in a conventional operating mode where engine load is used to simultaneously vary engine speed via an engine's throttle setting. The machine's transmission may be operably controlled by varying transmission speed ratio in combination with engine speed to achieve desired operational settings. Conventional operating modes may be used when a machine is performing a work function, such as a grading, digging, or other work function. When the machine is not performing a work function, however, it may be desirable to switch to a different operating mode to achieve better fuel efficiency.

In this disclosure, embodiments are presented for operably controlling a work machine between a plurality of operating modes to achieve improved fuel efficiency under predefined operating conditions.

SUMMARY

In one embodiment of the present disclosure, a method of selecting an economy operating mode of a work machine, includes providing an engine, a hydrostatic transmission including a motor and a pump, a controller, a throttle control, and a machine sensor; detecting a current throttle position of the throttle control and a current machine speed with the machine speed sensor; determining a current drivetrain load of the machine with the controller as a function of motor torque, a drivetrain ratio, a drivetrain mechanical efficiency, a final drive windage factor, and a rolling radius; decreasing the current throttle position of the throttle control to a decreased throttle position if a ratio of the current drivetrain load to an available drivetrain load is less than a load threshold; increasing a transmission ratio of the transmission by the controller to an increased transmission ratio so long as the machine ground speed is approximately the same as the current machine groundspeed; and operably controlling the machine in the economy operating mode at the decreased throttle position and increased transmission ratio while maintaining the machine ground speed at approximately the current machine groundspeed.

In one example of this embodiment, the method includes not performing the decreasing and increasing steps if the machine ground speed is not maintained at approximately the current machine groundspeed. In a second example, the determining step comprises calculating motor torque as a function of a pressure drop across the motor, a hydrostatic motor displacement, and an efficiency of the motor. In a third example, the method includes providing a first pressure sensor for detecting a first fluid pressure at the motor and a second pressure sensor for detecting a second fluid pressure at the pump, the first and second pressure sensors being in communication with the controller; and determining by the controller the pressure drop based on a difference between the first and second fluid pressures.

In a fourth example, the method includes providing a look-up table stored, the in a memory unit of the controller look-up table comprising values of the final drive windage factor for the machine. In a fifth example, the method may include providing a displacement map stored in a memory unit of the controller, the map including motor displacement values as a function of solenoid current; and determining by the controller motor torque based on a measured solenoid current and motor displacement obtained from the displacement map.

In a sixth example of this embodiment, the method may include storing a rimpull curve in the controller, the rimpull curve providing available drivetrain load values as a function of machine ground speed; and determining by the controller the ratio of current drivetrain load to the available drivetrain load from the rimpull curve. In a seventh example, the method may include continuing to operate the machine without performing the increasing or decreasing steps if the ratio of the current drivetrain load to the available drivetrain load is greater than the load threshold. In another example, the method may include after the continuing step, repeating the detecting and determining steps by the controller; and comparing by the controller another ratio of the current drivetrain load and available torque load to a second load threshold, where the second load threshold is less than the first load threshold. In a further example, the method includes performing by the controller the increasing and decreasing steps after the repeating and comparing steps.

In another embodiment of the present disclosure, a method of controlling a work machine between a plurality of operating modes includes providing a drivetrain including a motor and a pump, a control system, a throttle control, and a machine groundspeed sensor; controllably operating the work machine in a performance operating mode at a first throttle position of the throttle control, a first transmission ratio, and a desired machine groundspeed, the performance operating mode being a first of the plurality of operating modes; determining a current rimpull of the work machine with the control system at the first throttle position, the current rimpull being a function of motor torque, a drivetrain ratio, a drivetrain mechanical efficiency, a final drive windage factor, and a rolling radius; determining an available rimpull at the desired machine groundspeed by the control system; comparing a ratio by the control system of the current rimpull and the available rimpull to a rimpull threshold; adjusting the first throttle position of the throttle control to a second throttle position and the first transmission ratio to a second transmission ratio, where the second throttle position is less than the first throttle position and the second transmission ratio is greater than the first transmission ratio; and maintaining machine groundspeed at approximately the desired machine groundspeed after the adjusting step.

In one example of this embodiment, the method may include performing the adjusting step only if the machine groundspeed is maintained at the desired machine groundspeed. In a second example, the method includes controlling the work machine in a first economy operating mode or a second economy operating mode after the adjusting step, where in the first economy operating mode the second transmission ratio comprises a forward or reverse ratio and in the second economy operating mode the second transmission ratio comprises only a reverse ratio. In a third example, the determining step includes calculating motor torque as a function of a pressure drop across the motor, a motor displacement, and an efficiency of the motor.

In a further example of this embodiment, the method may include providing a first pressure sensor for detecting a first fluid pressure at the motor and a second pressure sensor for detecting a second fluid pressure at the pump, the first and second pressure sensors being in communication with the control system; determining the pressure drop across the motor by the control system based on a difference between the first and second fluid pressures. In another example, the method may include storing a rimpull curve in the controller, the rimpull curve providing a plurality of available rimpull values as a function of machine ground speed; and determining by the control system the ratio of current rimpull to the available rimpull from the rimpull curve.

In a further embodiment of the present disclosure, a method of controlling a work machine between a plurality of operating modes, the plurality of operating modes including at least a performance operating mode and an economy operating mode, the method includes providing a drivetrain including a motor and a pump, a control system, a throttle control, and a user control for selecting between at least the performance operating mode and the economy operating mode; controlling the work machine in the performance operating mode at a first throttle position of the throttle control, a first transmission ratio, and a desired machine groundspeed; detecting a change in a position of the user control to the economy mode; determining a current rimpull of the work machine with the control system at the first throttle position, the current rimpull being a function of least a pressure drop across the motor, a motor displacement, a drivetrain ratio, an efficiency of the drivetrain or motor, a final drive windage factor, and a rolling radius; determining an available rimpull at the desired machine groundspeed by the control system; comparing a ratio by the control system of the current rimpull and the available rimpull to a rimpull threshold; adjusting the first throttle position of the throttle control to a second throttle position and the first transmission ratio to a second transmission ratio so long as the machine groundspeed maintains approximately the desired groundspeed after the adjusting step, where the second throttle position is less than the first throttle position and the second transmission ratio is greater than the first transmission ratio; and operating the work machine in the economy mode at the desired ground speed, the second throttle position, and the second transmission ratio after the adjusting step.

In one example of this embodiment, the detecting step comprises detecting the position of user control in a first economy mode or a second economy mode, where in the first economy operating mode the second transmission ratio comprises a forward or reverse ratio and in the second economy operating mode the second transmission ratio comprises only a reverse ratio. In another example, the method may include storing a rimpull curve in a controller of the control system, the rimpull curve providing a plurality of available rimpull values as a function of machine ground speed; and determining by the control system the ratio of current rimpull to the available rimpull from the rimpull curve. In a further example, the method may include not performing the adjusting step if the machine ground speed is not maintained at approximately the desired machine groundspeed.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
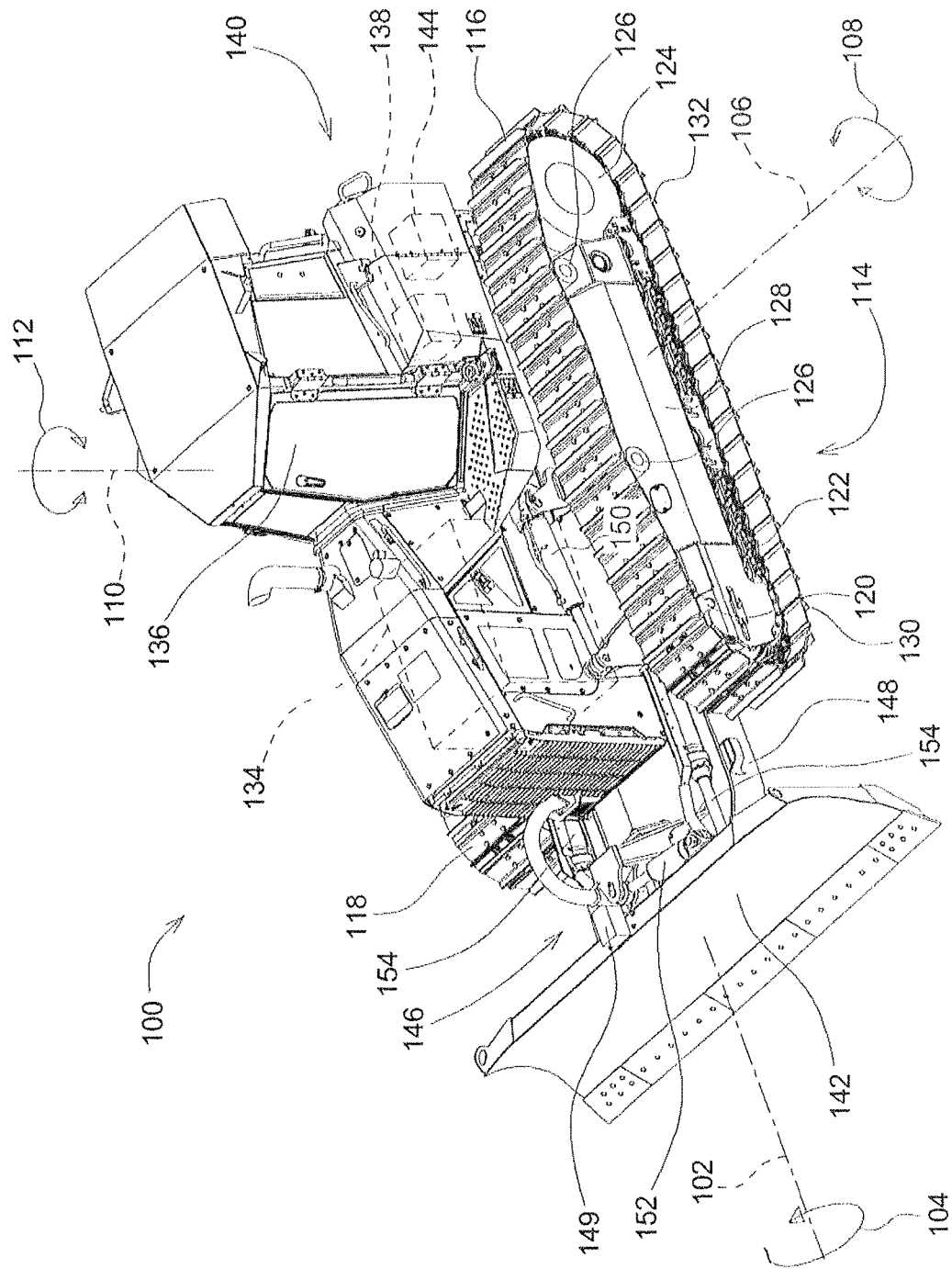
FIG. 1 is a side view of a work machine such as a dozer crawler.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates. FIG. 1 is a perspective view of work vehicle 100. Work vehicle 100 is illustrated as a crawler dozer, which may also be referred to as a crawler, but may be any work vehicle with a ground-engaging blade or work implement such as a compact track loader, motor grader, scraper, skid steer, and tractor, to name a few examples. Work vehicle 100 may be operated to engage the ground and cut and move material to achieve simple or complex features on the ground. As used herein, directions with regard to work vehicle 100 may be referred to from the perspective of an operator seated within operator station 136: the left of work vehicle 100 is to the left of such an operator, the right of work vehicle 100 is to the right of such an operator, the front or fore of work vehicle 100 is the direction such an operator faces, the rear or aft of work vehicle 100 is behind such an operator, the top of work vehicle 100 is above such an operator, and the bottom of work vehicle 100 is below such an operator. While operating, work vehicle 100 may experience movement in three directions and rotation in three directions. Direction for work vehicle 100 may also be referred to with regard to longitude 102 or the longitudinal direction, latitude 106 or the lateral direction, and vertical 110 or the vertical direction. Rotation for work vehicle 100 may be referred to as roll 104 or the roll direction, pitch 108 or the pitch direction, and yaw 112 or the yaw direction or heading.

Work vehicle 100 is supported on the ground by undercarriage 114. Undercarriage 114 includes left track 116 and right track 118, which engage the ground and provide tractive force for work vehicle 100. Left track 116 and right track 118 may be comprised of shoes with grousers that sink into the ground to increase traction, and interconnecting components that allow the tracks to rotate about front idlers 120, track rollers 122, rear sprockets 124 and top idlers 126. Such interconnecting components may include links, pins, bushings, and guides, to name a few components. Front idlers 120, track rollers 122, and rear sprockets 124, on both the left and right sides of work vehicle 100, provide support for work vehicle 100 on the ground. Front idlers 120, track rollers 122, rear sprockets 124, and top idlers 126 are all pivotally connected to the remainder of work vehicle 100 and rotationally coupled to their respective tracks so as to rotate with those tracks. Track frame 128 provides structural support or strength to these components and the remainder of undercarriage 114.

Front idlers 120 are positioned at the longitudinal front of left track 116 and right track 118 and provide a rotating surface for the tracks to rotate about and a support point to transfer force between work vehicle 100 and the ground. Left track 116 and right track 118 rotate about front idlers 120 as they transition between their vertically lower and vertically upper portions parallel to the ground, so approximately half of the outer diameter of each of front idlers 120 is engaged with left track 116 or right track 118. This engagement may be through a sprocket and pin arrangement, where pins included in left track 116 and right track 118 are engaged by recesses in front idler 120 so as to transfer force. This engagement also results in the vertical height of left track 116 and right track 118 being only slightly larger than the outer diameter of each of front idlers 120 at the longitudinal front of left track 116 and right track 118. Frontmost engaging point 130 of left track 116 and right track 118 can be approximated as the point on each track vertically below the center of front idlers 120, which is the frontmost point of left track 116 and right track 118 which engages the ground. When work vehicle 100 encounters a ground feature when traveling in a forward direction, left track 116 and right track 118 may first encounter it at frontmost engaging point 130.

If the ground feature is at a higher elevation than the surrounding ground surface (i.e., an upward ground feature), work vehicle 100 may begin pitching backward (which may also be referred to as pitching upward) when frontmost engaging point 130 reaches the ground feature. If the ground feature is at a lower elevation than the surrounding ground surface (i.e., a downward ground feature), work vehicle 100 may continue forward without pitching until the center of gravity of work vehicle 100 is vertically above the edge of the downward ground feature. At that point, work vehicle 100 may pitch forward (which may also be referred to as pitching downward) until frontmost engaging point 130 contacts the ground. In this embodiment, front idlers 120 are not powered and thus are freely driven by left track 116 and right track 118. In alternative embodiments, front idlers 120 may be powered, such as by an electric or hydraulic motor, or may have an included braking mechanism configured to resist rotation and thereby slow left track 116 and right track 118.

Track rollers 122 are longitudinally positioned between front idler 120 and rear sprocket 124 along the bottom left and bottom right sides of work vehicle 100. Each of track rollers 122 may be rotationally coupled to left track 116 or right track 118 through engagement between an upper surface of the tracks and a lower surface of track rollers 122. This configuration may allow track rollers 122 to provide support to work vehicle 100, and in particular may allow for the transfer of forces in the vertical direction between work vehicle 100 and the ground. This configuration also resists the upward deflection of left track 116 and right track 118 as they traverse an upward ground feature whose longitudinal length is less than the distance between front idler 120 and rear sprocket 124.

Rear sprockets 124 may be positioned at the longitudinal rear of left track 116 and right track 118 and, similar to front idlers 120, provide a rotating surface for the tracks to rotate about and a support point to transfer force between work vehicle 100 and the ground. Left track 116 and right track 118 rotate about rear sprockets 124 as they transition between their vertically lower and vertically upper portions parallel to the ground, so approximately half of the outer diameter of each of rear sprockets 124 is engaged with left track 116 or right track 118. This engagement may be through a sprocket and pin arrangement, where pins included in left track 116 and right track 118 are engaged by recesses in rear sprockets 124 so as to transfer force. This engagement also results in the vertical height of left track 116 and right track 118 being only slightly larger than the outer diameter of each of rear sprockets 124 at the longitudinal back or rear of left track 116 and right track 118. Rearmost engaging point 132 of left track 116 and right track 118 can be approximated as the point on each track vertically below the center of rear sprockets 124, which is the rearmost point of left track 116 and right track 118 which engages the ground. When work vehicle 100 encounters a ground feature when traveling in a reverse or backward direction, left track 116 and right track 118 may first encounter it at rearmost engaging point 132. If the ground feature is at a higher elevation than the surrounding ground surface, work vehicle 100 may begin pitching forward when rearmost engaging point 132 reaches the ground feature. If the ground feature is at a lower elevation than the surrounding ground surface, work vehicle 100 may continue backward without pitching until the center of gravity of work vehicle 100 is vertically above the edge of the downward ground feature. At that point, work vehicle 100 may pitch backward until rearmost engaging point 132 contacts the ground.

In this embodiment, each of rear sprockets 124 may be powered by a rotationally coupled hydraulic motor so as drive left track 116 and right track 118 and thereby control propulsion and traction for work vehicle 100. Each of the left and right hydraulic motors may receive pressurized hydraulic fluid from a hydrostatic pump whose direction of flow and displacement controls the direction of rotation and speed of rotation for the left and right hydraulic motors. Each hydrostatic pump may be driven by engine 134 of work vehicle 100, and may be controlled by an operator in operator station 136 issuing commands which may be received by controller 138 and communicated to the left and right hydrostatic pumps by controller 138. In alternative embodiments, each of rear sprockets 124 may be driven by a rotationally coupled electric motor or a mechanical system transmitting power from engine 134.

Top idlers 126 are longitudinally positioned between front idlers 120 and rear sprockets 124 along the left and right sides of work vehicle 100 above track rollers 122. Similar to track rollers 122, each of top idlers 126 may be rotationally coupled to left track 116 or right track 118 through engagement between a lower surface of the tracks and an upper surface of top idlers 126. This configuration may allow top idlers 126 to support left track 116 and right track 118 for the longitudinal span between front idler 120 and rear sprocket 124, and prevent downward deflection of the upper portion of left track 116 and right track 118 parallel to the ground between front idler 120 and rear sprocket 124.

Undercarriage 114 is affixed to, and provides support and tractive effort for, chassis 140 of work vehicle 100. Chassis 140 is the frame which provides structural support and rigidity to work vehicle 100, allowing for the transfer of force between blade 142 and left track 116 and right track 118. In this embodiment, chassis 140 is a weldment comprised of multiple formed and joined steel members, but in alternative embodiments it may be comprised of any number of different materials or configurations. Sensor 144 is affixed to chassis 140 of work vehicle 100 and configured to provide a signal indicative of the movement and orientation of chassis 140. In alternative embodiments, sensor 144 may not be affixed directly to chassis 140, but may instead be connected to chassis 140 through intermediate components or structures, such as rubberized mounts. In these alternative embodiments, sensor 144 is not directly affixed to chassis 140 but is still connected to chassis 140 at a fixed relative position so as to experience the same motion as chassis 140.

Sensor 144 is configured to provide a signal indicative of the inclination of chassis 140 relative to the direction of gravity, an angular measurement in the direction of pitch 108. This signal may be referred to as a chassis inclination signal. Controller 138 may actuate blade 142 based on this chassis inclination signal. As used herein, "based on" means "based at least in part on" and does not mean "based solely on," such that it neither excludes nor requires additional factors. Sensor 144 may also be configured to provide a signal or signals indicative of other positions or velocities of chassis 140, including, its angular position, velocity, or acceleration in a direction such as the direction of roll 104, pitch 108, yaw 112, or its linear acceleration in a direction such as the direction of longitude 102, latitude 106, and vertical 110. Sensor 144 may be configured to directly measure inclination, measure angular velocity and integrate to arrive at inclination, or measure inclination and derive to arrive at angular velocity. The placement of sensor 144 on chassis 140 instead of on blade 142 or linkage 146 may allow sensor 144 to be better protected from damage, more firmly affixed to work vehicle 100, more easily packaged, or more easily integrated into another component of work vehicle 100 such as controller 138. This placement may allow for sensor 144 to be more cost effective, durable, reliable, or accurate than if sensor 144 were placed on blade 142 or linkage 146, even though placing sensor 144 directly on blade 142 or linkage 146 (such as sensor 149) may allow for a more direct reading of a position, velocity, or acceleration of those components.

Blade 142 is a work implement which may engage the ground or material to move or shape it. Blade 142 may be used to move material from one location to another and to create features on the ground, including flat areas, grades, hills, roads, or more complexly shaped features. In this embodiment, blade 142 of work vehicle 100 may be referred to as a six-way blade, six-way adjustable blade, or power-angle-tilt (PAT) blade. Blade 142 may be hydraulically actuated to move vertically up or vertically down (which may also be referred to as blade lift, or raise and lower), roll left or roll right (which may be referred to as blade tilt, or tilt left and tilt right), and yaw left or yaw right (which may be referred to as blade angle, or angle left and angle right). Alternative embodiments may utilize a blade with fewer hydraulically controlled degrees of freedom, such as a 4-way blade that may not be angled, or actuated in the direction of yaw 112.

Blade 142 is movably connected to chassis 140 of work vehicle 100 through linkage 146, which supports and actuates blade 142 and is configured to allow blade 142 to be raised or lowered relative to chassis 140 (i.e., moved in the direction of vertical 110). Linkage 146 may include multiple structural members to carry forces between blade 142 and the remainder of work vehicle 100 and may provide attachment points for hydraulic cylinders which may actuate blade 142 in the lift, tilt, and angle directions.

Linkage 146 includes c-frame 148, a structural member with a C-shape positioned rearward of blade 142, with the C-shape open toward the rear of work vehicle 100. Each rearward end of c-frame 148 is pivotally connected to chassis 140 of work vehicle 100, such as through a pin-bushing joint, allowing the front of c-frame 148 to be raised or lowered relative to work vehicle 100 about the pivotal connections at the rear of c-frame 148. The front portion of c-frame 148, which is approximately positioned at the lateral center of work vehicle 100, connects to blade 142 through a ball-socket joint. This allows blade 142 three degrees of freedom in its orientation relative to c-frame 148 (lift-tilt-angle) while still transferring rearward forces on blade 142 to the remainder of work vehicle 100.

Sensor 149 is affixed to blade 142 above the ball-socket joint connecting blade 142 to c-frame 148. Sensor 149, like sensor 144, may be configured to measure angular position (inclination or orientation), velocity, or acceleration, or linear acceleration. Sensor 149 may provide a blade inclination signal, which indicates the angle of blade 142 relative to gravity. In alternative embodiments, a sensor may be configured to instead measure an angle of linkage 146, such as an angle between linkage 146 and chassis 140, in order to determine a position of blade 142. In other alternative embodiments, sensor 149 may be configured to measure a position of blade 142 by measuring a different angle, such as one between linkage 146 and blade 142, or the linear displacement of a cylinder attached to linkage 146 or blade 142. In alternative embodiments, sensor 149 may not be affixed directly to blade 142, but may instead be connected to blade 142 through intermediate components or structures, such as rubberized mounts. In these alternative embodiments, sensor 149 is not directly affixed to blade 142 but is still connected to blade 142 at a fixed relative position so as to experience the same motion as blade 142.

Blade 142 may be raised or lowered relative to work vehicle 100 by the actuation of lift cylinders 150, which may raise and lower c-frame 148 and thus raise and lower blade 142, which may also be referred to as blade lift. For each of lift cylinders 150, the rod end is pivotally connected to an upward projecting clevis of c-frame 148 and the head end is pivotally connected to the remainder of work vehicle 100 just below and forward of operator station 136. The configuration of linkage 146 and the positioning of the pivotal connections for the head end and rod end of lift cylinders 150 results in the extension of lift cylinders 150 lowering blade 142 and the retraction of lift cylinders 150 raising blade 142. In alternative embodiments, blade 142 may be raised or lowered by a different mechanism, or lift cylinders 150 may be configured differently, such as a configuration in which the extension of lift cylinders 150 raises blade 142 and the retraction of lift cylinders 150 lowers blade 142.

Blade 142 may be tilted relative to work vehicle 100 by the actuation of tilt cylinder 152, which may also be referred to as moving blade 142 in the direction of roll 104. For tilt cylinder 152, the rod end is pivotally connected to a clevis positioned on the back and left sides of blade 142 above the ball-socket joint between blade 142 and c-frame 148 and the head end is pivotally connected to an upward projecting portion of linkage 146. The positioning of the pivotal connections for the head end and the rod end of tilt cylinder 152 result in the extension of tilt cylinder 152 tilting blade 142 to the left or counterclockwise when viewed from operator station 136 and the retraction of tilt cylinder 152 tilting blade 142 to the right or clockwise when viewed from operator station 136. In alternative embodiments, blade 142 may be tilted by a different mechanism (e.g., an electrical or hydraulic motor) or tilt cylinder 152 may be configured differently, such as a configuration in which it is mounted vertically and positioned on the left or right side of blade 142, or a configuration with two tilt cylinders.

Blade 142 may be angled relative to work vehicle 100 by the actuation of angle cylinders 154, which may also be referred to as moving blade 142 in the direction of yaw 112. For each of angle cylinders 154, the rod end is pivotally connected to a clevis of blade 142 while the head end is pivotally connected to a clevis of c-frame 148. One of angle cylinders 154 is positioned on the left side of work vehicle 100, left of the ball-socket joint between blade 142 and c-frame 148, and the other of angle cylinders 154 is positioned on the right side of work vehicle 100, right of the ball-socket joint between blade 142 and c-frame 148. This positioning results in the extension of the left of angle cylinders 154 and the retraction of the right of angle cylinders 154 angling blade 142 rightward, or yawing blade 142 clockwise when viewed from above, and the retraction of left of angle cylinder 150 and the extension of the right of angle cylinders 154 angling blade 142 leftward, or yawing blade 142 counterclockwise when viewed from above. In alternative embodiments, blade 142 may be angled by a different mechanism or angle cylinders 154 may be configured differently.

Due to the geometry of linkage 146 in this embodiment, blade 142 is not raised or lowered in a perfectly vertical line with respect to work vehicle 100. Instead, a point on blade 142 would trace a curve as blade 142 is raised and lowered. This means that the vertical component of the velocity of blade 142 is not perfectly proportional to the linear velocity with which lift cylinders 150 are extending or retracting, and the vertical component of blade 142's velocity may vary even when the linear velocity of lift cylinders 150 is constant. This also means that lift cylinders 150 have a mechanical advantage which varies depending on the position of linkage 146. Given a kinematic model of blade 142 and linkage 146 (e.g., formula(s) or table(s) providing a relationship between the position and/or movement of portions of blade 142 and linkage 146) and the state of blade 142 and linkage 146 (e.g., sensor(s) sensing one or more positions, angles, or orientations of blade 142 or linkage 146, such as sensor 149), at least with respect to blade lift, controller 138 may compensate for such non-linearity. Incomplete or simplified kinematic models may be used if there is a need to only focus on particular motion relationships (e.g., only those affecting blade lift) or if only limited compensation accuracy is desired. Controller 138 may utilize this compensation and a desired velocity, for example a command to raise blade 142 at a particular vertical velocity, to issue a command that may achieve a flow rate into lift cylinders 150 that results in blade 142 being raised at the particular vertical velocity regardless of the current position of linkage 146. For example, controller 138 may issue commands which vary the flow rate into lift cylinders 150 in order to achieve a substantially constant vertical velocity of blade 142.

Similarly, due to the positioning of tilt cylinder 152 and angle cylinders 154 and the configuration of their connection to blade 142, the angular velocity of blade tilt and angle is not perfectly proportional to the linear velocity of tilt cylinder 152 and angle cylinders 154, respectively, and the angular velocity of tilt and angle may vary even when the linear velocity of tilt cylinder 152 and angle cylinders 154, respectively, is constant. This also means that tilt cylinder 152 and angle cylinders 154 each has a mechanical advantage which varies depending on the position of blade 142. Much like with lift cylinders 150, given a kinematic model of blade 142 and linkage 146, and the state of blade 142 and linkage 146, at least with respect to blade tilt and angle, controller 138 may compensate for such non-linearity. Incomplete or simplified kinematic models may be used if there is a need to only focus on particular motion relationships (e.g., only those affecting blade tilt and angle) or if only limited compensation accuracy is required. Controller 138 may utilize this compensation and a desired angular velocity, for example a command to tilt or angle blade 142 at a particular angular velocity, to issue commands that may vary the flow rate into tilt cylinder 152 or angle cylinders 154 to result in blade 142 being tilted or angled at the particular angular velocity regardless of the current position of blade 142 or linkage 146.

In alternative embodiments, blade 142 may be connected to the remainder of work vehicle 100 in a manner which tends to make the blade lift velocity (in direction of vertical 110), tilt angular velocity (in the direction of roll 104), or angle angular velocity (in the direction of yaw 112) proportional to the linear velocity of lift cylinders 150, tilt cylinder 152, or angle cylinders 154, respectively. This may be achieved with particular designs of linkage 146 and positioning of the pivotal connections of lift cylinders 150, tilt cylinder 152, and angle cylinders 154. In such alternative embodiments, controller 138 may not need to compensate for non-linear responses of blade 142 to the actuation of lift cylinders 150, tilt cylinder 152, and angle cylinders 154, or the need for compensation may be reduced.

Each of lift cylinders 150, tilt cylinder 152, and angle cylinders 154 is a double acting hydraulic cylinder. One end of each cylinder may be referred to as a head end, and the end of each cylinder opposite the head end may be referred to as a rod end. Each of the head end and the rod end may be fixedly connected to another component or, as in this embodiment, pivotally connected to another component, such as a through a pin-bushing or pin-bearing coupling, to name but two examples of pivotal connections. As a double acting hydraulic cylinder, each may exert a force in the extending or retracting direction. Directing pressurized hydraulic fluid into a head chamber of the cylinders will tend to exert a force in the extending direction, while directing pressurized hydraulic fluid into a rod chamber of the cylinders will tend to exert a force in the retracting direction. The head chamber and the rod chamber may both be located within a barrel of the hydraulic cylinder, and may both be part of a larger cavity which is separated by a movable piston connected to a rod of the hydraulic cylinder. The volumes of each of the head chamber and the rod chamber change with movement of the piston, while movement of the piston results in extension or retraction of the hydraulic cylinder.

Figure 2:
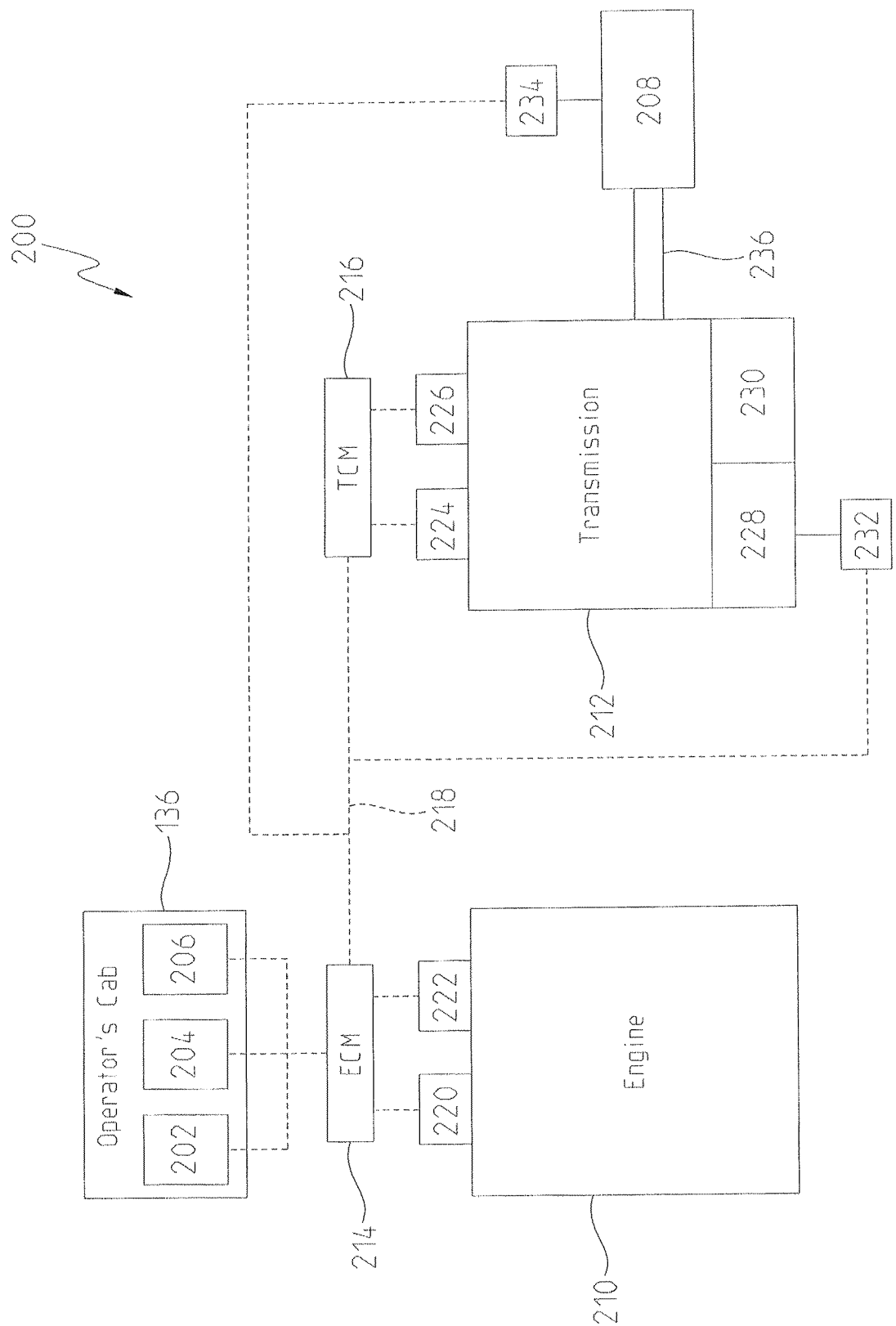
FIG. 2 is a diagram of a control system of a work machine.

Referring now to FIG. 2, an embodiment of a control system 200 is shown for a work machine or vehicle. The system 200 may be part of the work machine 100 of FIG. 1, which includes the operator's cab 136 having a plurality of controls 110. The plurality of controls may include an input control device 202, a throttle control 204, and a user operating mode control 206. The input control device 202 may include a steering wheel, a brake control, a direction control, a joystick, lever or other control device for controlling the machine 100. The throttle control 204 may be used to control a throttle position of an engine 210. The engine 210 is capable of producing power to a transmission 212. The transmission 212 may include a hydrostatic transmission 212 having a pump 228 and a motor 230.

The transmission 212 is capable of receiving the power from the engine 210 and transferring the power to a driveline 236 of the work machine 100. The driveline 236 may include one or more axles to which one or more traction devices 208 are mounted. Each traction device 208 may include a wheel or track for propelling the machine 100 along a ground surface.

The engine 210 may be controlled by an engine control module (ECM) 214 or engine controller, as shown in FIG. 2. Likewise, the transmission 212 may be controlled by a transmission control module (TCM) 216 or transmission controller. The engine control module 214 and the transmission control module 216 may be in electrical communication with one another via a communication or Controller Access Network (CAN bus) link. An example of a CAN bus is J-1939 communication link.

The ECM 214 and the TCM 216 may be in electrical communication with a plurality of sensors disposed in the control system 200. For example, a speed sensor 234 may detect a speed of the work machine 100 during operation. The speed sensor 234 may be any conventional speed sensor, accelerometer, or other known sensor for measuring speed. The sensor 234 may be capable of detecting a current speed and communicating this to either or both the ECM 214 and the TCM 216. For purposes of this disclosure, the speed detected by the sensor 234 may be either a track speed or wheel speed, depending upon whether the work machine has wheels or tracks as ground-engaging mechanisms. For example, a track speed sensor (not shown) may be disposed at the hydrostatic motor for detecting machine track speed. Machine track speed may differ from a groundspeed of the machine due to slip in the tracks. In one instance, groundspeed may be detected by a global-positioning sensor (GPS) or any other conventional means.

An engine speed sensor 220 may be disposed in the control system 200 for detecting an engine speed of the engine 210. Moreover, a transmission input speed sensor 224 may detect an input speed of the transmission 212, and a transmission output speed sensor 226 may detect an output speed of the transmission 212. The engine speed sensor 220, transmission input speed sensor 224, and the transmission output speed sensor 226 may be disposed in electrical communication with the ECM 214, TCM 216, or both. If one or more of the sensors are only connected to either the ECM 214 or the TCM 216, the ECM 214 and TCM 216 can communicate the speeds to the other over the CAN link 218.

An engine torque sensor 222 may be configured to detect an engine torque and communicate the same to the ECM 214, TCM 216, or both. Similarly, a transmission torque sensor (not shown) may be provided at the input, the output, or both with respect to the transmission 212, and the sensor may communicate torque readings to the ECM 214, the TCM 216, or both.

In FIG. 2, the control system 200 is also shown including a pressure sensor 232 located at or near the pump 228 of the hydrostatic transmission 212. Although not shown, another pressure sensor may be disposed at or near the motor for detecting a charge pressure. The pressure drop across the motor may be determined based on the difference of the two pressure readings.

The transmission 212 is described as being a hydrostatic transmission, but the present disclosure is not limited to such an embodiment. Rather, the transmission 212 may be an electric drive transmission, a mechanical continuously variable transmission (CVT), an infinitely variable transmission (IVT), or other known transmissions.

The control system 200 is also shown including a user operating mode control 206. The user operating mode control 206 may be a switch, rotary dial, lever, push button, or other known type of control. The control 206 may be optional in at least one embodiment. An operator may be use the user operating mode control 206 to enable or disable one or more operating modes of the work machine 100. For example, the work machine 100 may be capable of operating in at least a performance operating mode and an economy operating mode. In a performance operating mode, the work machine may be performing a work function or it may be at least partially loaded. In other aspects, the work machine may be ascending a steep grade, and under these conditions, the work machine may operate in the performance operating mode. The performance operating mode may include characteristics such as a higher level of throttle control, higher transmission ratio, and lower ground speed. During the performance operating mode, the work machine is being controlled to perform a certain function, and fuel efficiency is not a priority under these circumstances.

However, at other times, when the work machine is not performing a certain function or it is not loaded, it may be desirable to increase fuel efficiency and control the engine 210 at more optimal operating points. Under these conditions, the control system 200 may operably control the work machine to operate in accordance with an economy operating mode.

In at least one embodiment, the work machine 100 may be controlled in accordance with a first economy operating mode and a second economy operating mode. In the first economy operating mode, the work machine 100 functions in this mode in both a forward and reverse direction. In other words, the work machine 100 is capable of being controlled in accordance with the first economy operating mode when travelling in a forward or reverse direction. In the second economy operating mode, however, the work machine 100 may only be controlled here when travelling in the reverse direction. Thus, the work machine 100 may be controlled in accordance with the performance operating mode when travelling in the forward direction and in accordance with the second operating mode when travelling in the reverse direction.

In other embodiments, there may be additional performance and economy operating modes. The user operating mode control 206 may be controlled by the operator to select any of the plurality of operating modes, including the one or more performance operating modes and the one or more economy operating modes. By selecting a desired operating mode via the user operating mode control 206, the ECM 214, TCM 216, or both may receive the communication from the control 206 indicative of the desired operating mode.

While the user operating mode control 206 is shown in FIG. 2, it is understood as noted above that this control is optional. The control system 200 may be capable of automatically detecting the conditions under which the work machine 100 is capable of operating in an economy operating mode. Thus, the control system 200 may be programmed with a corresponding algorithm or software for selecting which operating mode the work machine 100 is operably controlled.

Figure 3:
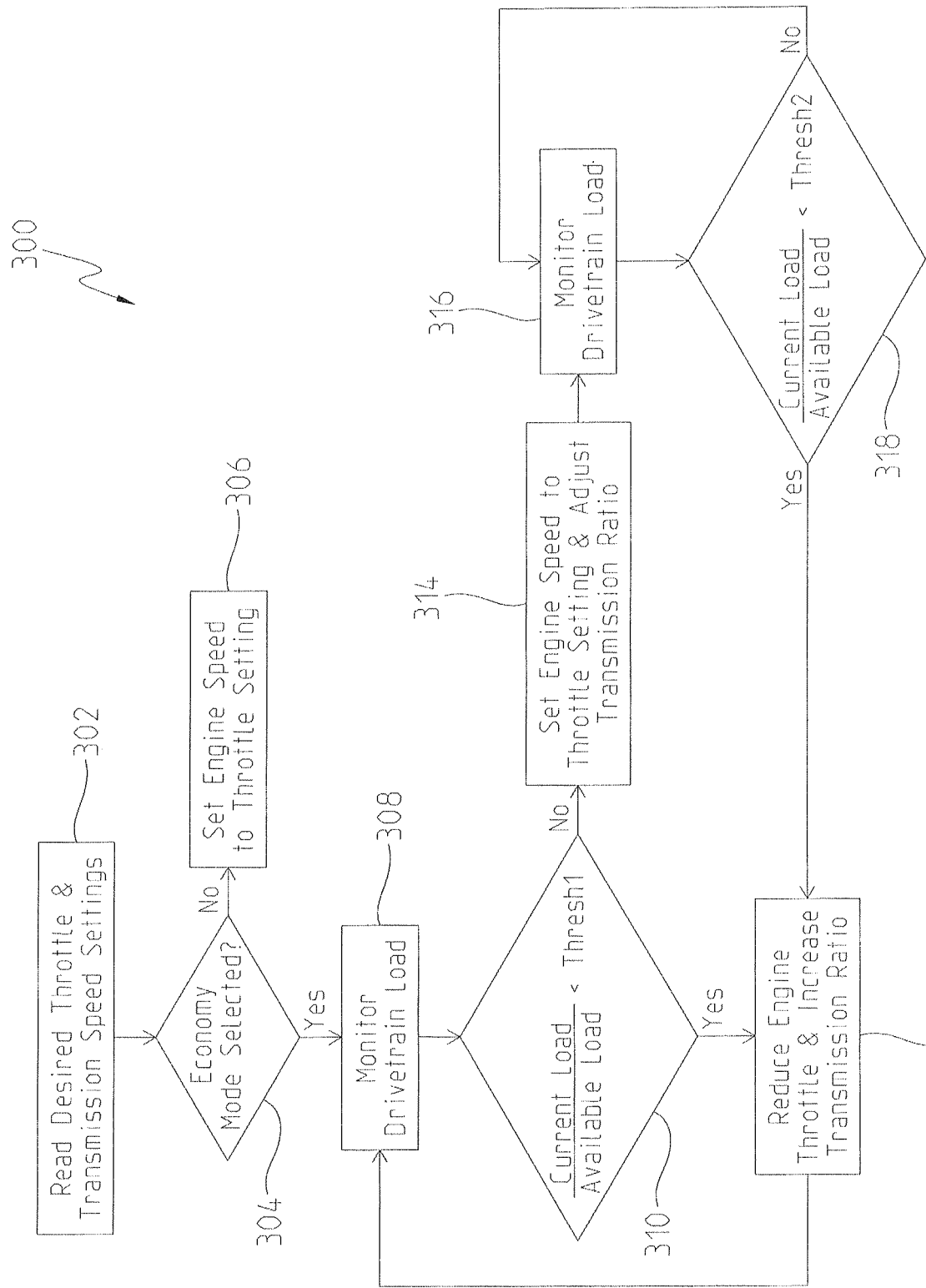
FIG. 3 is a flow diagram of a method of controlling a work machine in accordance with an economy operating mode.

An example of such an algorithm 300 is illustrated in FIG. 3. The algorithm 300 may be stored in the TCM 216, for example, so that the TCM 216 is able to determine when to selectively control the work machine 100 in one of its plurality of operating modes. The algorithm 300 may include a plurality of blocks or steps for selectively controlling the machine in one of the plurality of operating modes.

According to the algorithm 300 in FIG. 3, a first block 302 of the method is to read a desired throttle and transmission speed settings. Here, the TCM 216 obtains a current throttle position of the throttle control 204. In at least one example, the TCM 216 receives the current throttle position over the CAN link 218. In another example, the TCM 216 may receive the current throttle position via another means. In any event, the current throttle position may be indicative of a throttle command from the operator based on the position of the throttle control 204.

With the TCM 216 operably controlling the transmission 212, the TCM 216 is able to detect or determine a current transmission gear or speed ratio. The ratio may be determined by dividing the transmission output speed by the transmission input speed, the values of which may be obtained from the transmission output speed sensor 226 and the transmission input speed sensor 224, respectively. In addition, the TCM 216 may obtain the current speed of the work machine 100, e.g., track speed or wheel speed. This may be obtained, for example, from the speed sensor 234. Alternatively, the TCM 216 may determine machine speed from engine speed, transmission input speed, or transmission output speed.

Once the TCM 216 determines the current operating conditions of the work machine 100, the TCM 216 may advance to block 304 to determine if an economy operating mode is selected. This may be relevant if the control system 200 includes the user operating mode control 206, as described above. If the operator, for example, selects the economy operating mode via the user operating mode control 206, the TCM 216 may receive this command and continue executing the algorithm. If, however, the TCM 216 receives a command that indicates the operator does not want the economy operating mode, then the algorithm 300 advances to block 306 and the work machine 100 may continue to operate in its current operating mode at the current throttle position and current transmission ratio. Here, the TCM 216 may communicate a throttle command to the ECM 214 based on the current throttle setting.

Block 304 is optional in some embodiments of the present disclosure. In the event block 304 is optional, or the operator has selected the economy operating mode, the algorithm may advance to block 308 in which the TCM 216 operably monitors drivetrain load. Here, the TCM 216 determines the current drivetrain load of the work machine 100. It is noteworthy that the TCM 216 decides whether to implement the economy operating mode based on drivetrain load, rather than engine load or engine speed. To do so, the TCM 216 operably determines a current rimpull of the machine 100. Rimpull is defined as the tangential shear force exerted by the driving surface of the machine (i.e., traction device) on the ground surface. A work machine's rimpull force capability ($F_{Rimpull}$) may be calculated by the TCM 216 from the following equation:

$$F_{Rimpull} = \frac{(\tau_{Motor} - \tau_{FinalDriveWindage}) \times DriveRatio \times \eta_{Drivetrain}}{rolling\_radius}$$

where $\tau_{Motor}$ refers to motor torque, $\tau_{FinalDriveWindage}$ refers to the final drive windage, DriveRatio refers to an effective drivetrain reduction ratio, $\eta_{Drivetrain}$ refers to an effective drivetrain mechanical efficiency, and rolling_radius refers to the rolling radius of the wheel or sprocket of the traction device 208.

The motor torque may be determined by the TCM 216 based on the following equation:

$$\tau_{Motor} = D_{Motor} \times dP \times \eta_{Motor,Mechanical}$$

where $D_{Motor}$ is a hydrostatic motor displacement, dP refers to a pressure drop across the hydrostatic motor, and $\eta_{Motor,Mechanical}$ is a mechanical efficiency of the hydrostatic motor.

In the above equations, the effective drivetrain ratio, effective drivetrain mechanical efficiency, and rolling radius are constant parameters known by the TCM 216. These values may be predefined and preloaded into the TCM 216, or otherwise communicated to the TCM 216 as necessary. The final drive windage may be obtained by the TCM 216 or communicated to the TCM 216 (e.g., by the ECM 214) based on a look-up table of windage values as a function of hydrostatic motor speed. The look-up table may be stored in a memory unit of the ECM 214, the TCM 216, or both. The hydrostatic motor displacement may also be known by the TCM 216 as a predefined value, or it may be determined from a look-up table, graph, chart, or other data. The mechanical efficiency of the hydrostatic motor may be predefined or obtained from a look-up table stored in the ECM 214, TCM 216, or both. The pressure drop across the hydrostatic motor may be determined based on pressure readings by a high loop pressure sensor at the motor and a charge pressure measured by a pressure sensor at the hydrostatic pump.

In the event a different type of transmission is used, such as an electric drive, the TCM 216 may determine motor displacement based on a displacement map having displacement values as a function of solenoid current. While solenoid current is noted here, it may be possible to determine displacement based on voltage at the motor, generator or electrical system as well.

Once the current rimpull is known or calculated by the TCM 216, the algorithm 300 may advance to block 310. In block 310, the TCM 216 may first determine an available load or rimpull. To do so, the TCM 216 may include a maximum rimpull curve stored in its memory unit, where the maximum rimpull curve is provided as a function of work machine track or wheel speed. An example of a maximum rimpull curve is illustrated in FIG. 4.

Figure 4:
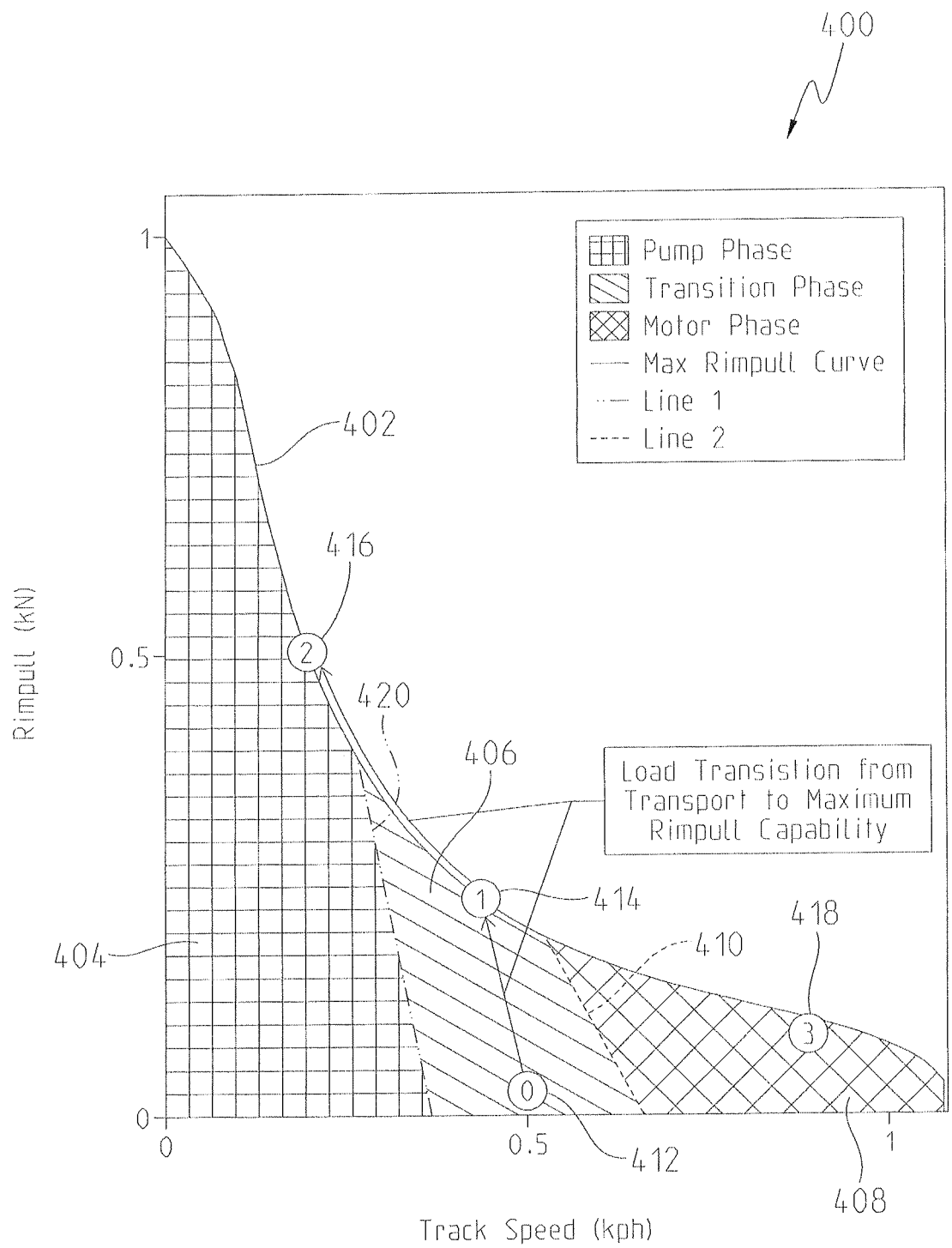
FIG. 4 is a diagram of a rimpull curve including a plurality of available drivetrain load values as a function of work machine speed.

Referring to FIG. 4, a graphical embodiment 400 of a maximum rimpull curve 402 is shown with respect to a work machine track speed. The maximum rimpull curve 402 is representative of a maximum amount of output drivetrain torque available at a given track speed. The area below the curve 402 is shaded to form three different operating regions. In a first operating region 404, the area is for a pump phase. Here, the hydrostatic motor operates at 100% whereas the hydrostatic pump operates at less than 100%. For example, the pump may operate between 0-90%. In this area, the speed is low and the rimpull may be at its greatest. For instance, a data point 416 is shown lying on the curve 402 in the first operating region 404. At this point, the machine may be fully loaded, is at a maximum rimpull capability for the given track speed, and operating in a performance mode.

A first transition line 420 separates the first operating region 404 from a second operating region 406. In the second operating region 404 below the maximum rimpull curve 402, the hydrostatic pump may operate between 90-100% and the hydrostatic motor may operate at greater than 50%, e.g., between 50-100%. In this second operating region 406, there are two data points shown. A first data point 412 is indicative of the work machine 100 travelling in a transport mode on flat ground. The transmission is not loaded, the current rimpull is low (e.g., 0-10 kN), and the machine is travelling at a higher track speed than in the first operating region 402 (e.g., approximately 5 kph in FIG. 4).

A second data point 414 in the second operating region 406 represents a transition from the transport mode 412 to a maximum rimpull capability. Here, the machine may be operating with a light load but at maximum rimpull capability, and thus likely in a performance operating mode. If the machine is operating at either data point 416 or 414, the current rimpull or drivetrain load is equivalent or approximately equivalent to the available rimpull or drivetrain load.

A second transition line 410 is shown in FIG. 4 indicative of a transition between the second operating region 406 and a third operating region 408. In the third operating region 408, the work machine is operating at a higher track speed than in the first and second operating regions. As a result, the maximum rimpull is less in this third operating region 408 than in the first and second operating regions. A data point 418 is shown in the third operating region in which the hydrostatic pump is operating at approximately 100% and the hydrostatic motor is operating at approximately 50% or less (e.g., in the range between 35-52%). The data point 418 is lying on or near the maximum available rimpull, and thus under these conditions, the machine is likely operating in a performance mode.

Returning to the algorithm 300 in FIG. 3, and in particular to block 310, the TCM 216 may determine the available rimpull based on the machine speed. Once the available rimpull or drivetrain load is determined from the curve 402, the TCM 216 may determine a ratio of current rimpull or drivetrain load to the available rimpull or drivetrain load at the current operating track speed. This ratio is then compared by the TCM 216 to a first rimpull threshold, Thresh1, in block 310. In FIG. 3, the first rimpull threshold, Thresh1, may be approximately 95% or less, but this is only intended to be one non-limiting example. The first rimpull threshold may be predefined as any percentage used to controllably select an economy operating mode.

Based on the comparison of the ratio to the first rimpull threshold, the algorithm 300 either advances to block 312 or block 314. In block 312, the TCM 216 determines that the ratio satisfies the first rimpull threshold and it is able to selectively command a lower throttle than the current throttle setting (e.g., command 70% throttle compared to 100% operator-selected throttle setting) and increase transmission ratio to correspond with an economy operating mode. For example, the TCM 216 may communicate a throttle command to the ECM 214 of approximately 25-30% lower than the current throttle setting. So, if the current throttle setting is 95%, the TCM 216 may command the throttle position to reduce to approximately 65-70%. A 25-30% reduction of throttle position, however, is only one non-limiting example. The amount the throttle position is reduced may be adjusted as described further below.

In addition to communicating a lower throttle command, the TCM 216 may also increase transmission ratio by approximately the same amount of reduction of throttle command. For example, if the throttle command is reduced by 25-30%, then the TCM 216 may increase the transmission ratio by approximately 25-30%. This, however, may only be done so long as the machine track or wheel speed is maintained as approximately the current track speed at block 302 following the adjustment. The machine track or wheel speed may correspond with an output drivetrain speed. This adjustable control by the TCM 216 may be open loop such that if track or wheel speed can only be maintained by reducing throttle command by 10% and increasing transmission ratio by 10%, then that is the limit to the amount of adjustment the TCM 216 will make. Moreover, if track or wheel speed cannot be maintained by even a limited adjustment of throttle command and transmission ratio, then the TCM 216 will not make any adjustments so that current track speed is maintained.

To further illustrate this point, reference is made to FIG. 4. Upon execution of blocks 302 and 304, the machine 100 is operating at the first data point 412. For sake of simplicity and this example, the current machine track speed is approximately 0.5 kph and the current rimpull is 10 kN. Suppose the maximum available rimpull at this track speed corresponds with the second data point 414. Here, suppose the available rimpull is 100 kN. Thus, in block 310, the TCM 216 determines the ratio of current to available rimpull is 10%, which is less than the first rimpull threshold of 95%, for example. These values are only provided to serve as a non-limiting example and may differ in other examples.

In this example, the ratio satisfies the first rimpull threshold and the method 300 advances to block 312. Here, the TCM 216 sends a new throttle command to the ECM 214 to decrease throttle and the transmission ratio is increased. As this is done, the method 300 returns to blocks 308 and 310 where the TCM 216 determines the current rimpull or drivetrain load and compares it to the available rimpull or drivetrain load. This closed-loop control may be continuously executed by the TCM 216, and throttle command and transmission ratio may continuously be adjusted over time. If the TCM 216 determines that a proposed throttle command and adjustment to transmission ratio may result in a change in track speed from the current track speed, the TCM 216 may limit the throttle command and transmission ratio adjustment so that track speed does not substantially change from its current track speed. Thus, the operator may not detect a different in machine performance with the track speed remaining approximately the same, but in effect throttle command and transmission ratio may be continuously adjusted to benefit fuel economy.

The TCM 216 may send a command over the CAN link 218 to the ECM 214 to make adjustments to throttle position, and the TCM 216 may communicate commands to valves, solenoids, and the like in the transmission 212 to increase transmission ratio.

The transmission load in FIG. 3 may correspond with output transmission motor torque or output rimpull from the drivetrain.

After block 312 and as described above, the TCM 216 continuously monitors drivetrain load in block 308 to ensure operating conditions have not changed, thereby necessitating a change to a different operating mode. This may include switching to a different economy operating mode, or to a performance or other non-economy operating mode.

In the event the ratio does not satisfy the first rimpull threshold in block 310, the algorithm 300 advances to block 314. In block 314, the TCM 216 may set engine speed based on the current throttle position and adjust transmission ratio as needed to ensure the current groundspeed is maintained. For example, the TCM 216 may communicate an increased throttle command to the ECM 214 to adjust engine speed, and transmission ratio may be decreased.

After block 314, the algorithm 300 may advance to block 316 in which drivetrain load is again determined in a manner similar to that in block 308. Once the current load is determined, the available load is again determined in block 318 by the TCM 216 with reference to the maximum rimpull curve 402. The ratio of current load and available load is determined in block 318 similar to that in block 310, and the ratio is compared to a second rimpull threshold, Thresh2. In FIG. 3, the second rimpull threshold, Thresh2, may be approximately 90% or less, and thus lower than the first rimpull threshold. The second rimpull threshold, Thresh2, of 90% is non-limiting and may be set at any desired ratio. Moreover, the second rimpull threshold, Thresh2, may be the same or different from the first rimpull threshold, Thresh1. The second rimpull threshold, Thresh2, may be a minimum rimpull threshold for selecting an economy operating mode. Thus, if the ratio does not satisfy the second rimpull threshold, Thresh2, in block 318, the algorithm 300 may return to block 316 where the current drivetrain load is continuously monitored and calculated.

In the event the ratio does satisfy the second rimpull threshold, Thresh2, in block 318, the algorithm 300 may advance to block 312 where the throttle command can be reduced and the transmission ratio can be increased so long as the machine track or wheel does not substantially change from the current track or wheel speed. If track speed cannot be maintained by making an adjustment of approximately 25-30%, then the the throttle command and transmission ratio may be adjusted accordingly so long as the track speed remains substantially constant.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A method of selecting an economy operating mode of a work machine, comprising:
providing an engine, a hydrostatic transmission including a hydrostatic circuit, a motor and a pump, a controller, a throttle control, and a speed sensor;
detecting a first throttle position of the throttle control and a current machine speed with the speed sensor;
determining a current drivetrain load of the machine with the controller as a function of motor torque, a drivetrain ratio, a drivetrain mechanical efficiency, a final drive windage factor, and a rolling radius;
communicating a throttle command to an engine controller if a ratio of the current drivetrain load to an available drivetrain load is less than a load threshold, where the throttle command is indicative of a new throttle position being less than the first throttle position;
increasing a transmission ratio of the transmission by the controller to an increased transmission ratio if the ratio of the current drivetrain load to available drivetrain load is less than the load threshold; and
operably controlling the machine in the economy operating mode at the new throttle position based on the throttle command and increased transmission ratio.

2. The method of claim 1, further comprising:
detecting an actual machine speed after the communicating and increasing steps;
comparing the actual machine speed to the current machine speed; and
limiting the increase in transmission ratio so that the actual machine speed is approximately the same as the current machine speed.

3. The method of claim 1, wherein the determining step comprises calculating motor torque as a function of a pressure drop across the motor, a hydrostatic motor displacement, and an efficiency of the motor.

4. The method of claim 1, further comprising:
providing a first pressure sensor for detecting a first fluid pressure in the hydrostatic circuit and a second pressure sensor for detecting a second fluid pressure in the hydrostatic circuit, the first and second pressure sensors being in communication with the controller; and
determining by the controller a pressure drop in the hydrostatic circuit across the motor based on a difference between the first and second fluid pressures.

5. The method of claim 1, further comprising providing a look-up table stored in a memory unit of the controller look-up table comprising values of the final drive windage factor for the machine.

6. The method of claim 1, further comprising:
providing a displacement map stored in a memory unit of the controller, the map including motor displacement values as a function of solenoid current; and
determining by the controller motor torque based on a measured solenoid current and motor displacement obtained from the displacement map.

7. The method of claim 1, further comprising:
storing a rimpull curve in the controller, the rimpull curve providing available drivetrain load values as a function of machine speed; and
determining by the controller the ratio of current drivetrain load to the available drivetrain load from the rimpull curve.

8. The method of claim 1, further comprising continuing to operate the machine without performing the increasing step if the ratio of the current drivetrain load to the available drivetrain load is greater than the load threshold.

9. The method of claim 8, further comprising:
after the continuing step, repeating the detecting and determining steps by the controller; and
comparing by the controller another ratio of the current drivetrain load and available torque load to a second load threshold, where the second load threshold is less than the first load threshold.

10. The method of claim 1, wherein, after the repeating and comparing steps, performing by the controller the communicating and increasing steps.

11. A method of controlling a work machine between a plurality of operating modes, comprising:
providing a drivetrain including a motor and a pump, a control system, a throttle control, and a speed sensor;
controllably operating the work machine in a first operating mode at a current throttle position of the throttle control, a first transmission ratio, and a current machine speed, the first operating mode being one of the plurality of operating modes;
determining a current rimpull of the work machine with the control system at the current machine speed, the current rimpull being a function of motor torque, a drivetrain ratio, a drivetrain mechanical efficiency, a final drive windage factor, and a rolling radius;
determining an available rimpull at the current machine speed by the control system;
comparing a ratio by the control system of the current rimpull and the available rimpull to a rimpull threshold;
communicating a new throttle command to an engine controller of the control system based on the ratio; and
adjusting the first transmission ratio to a second transmission ratio if the ratio satisfies the rimpull ratio, where the throttle command is less than the current throttle position and the second transmission ratio is greater than the first transmission ratio.

12. The method of claim 11, further comprising:
detecting an actual machine speed after the communicating and adjusting steps;
comparing the actual machine speed to the current machine speed; and
limiting the increase in transmission ratio so that the actual machine speed is approximately the same as the current machine speed.

13. The method of claim 11, further comprising controlling the work machine in a first economy operating mode or a second economy operating mode after the adjusting step, where in the first economy operating mode the second transmission ratio comprises a forward or reverse ratio and in the second economy operating mode the second transmission ratio comprises only a reverse ratio.

14. The method of claim 11, wherein the determining step comprises calculating motor torque as a function of a pressure drop across the motor, a motor displacement, and an efficiency of the motor.

15. The method of claim 14, further comprising:
providing a first pressure sensor for detecting a first fluid pressure and a second pressure sensor for detecting a second fluid pressure, the first and second pressure sensors being in communication with the controller; and
determining by the controller a pressure drop across the motor based on a difference between the first and second fluid pressures.

16. The method of claim 11, further comprising:
storing a rimpull curve in the controller, the rimpull curve providing a plurality of available rimpull values as a function of machine speed; and
determining by the control system the ratio of current rimpull to the available rimpull from the rimpull curve.

17. The method of claim 11, wherein when the ratio does not satisfy the rimpull threshold, the control system increases the throttle command to the engine controller and decreases the transmission ratio.

18. A method of controlling a work machine between a plurality of operating modes, the plurality of operating modes including at least a performance operating mode and an economy operating mode, the method comprising:
providing a drivetrain including a motor and a pump, a control system having a transmission controller, a throttle control, and a user control for selecting between at least the performance operating mode and the economy operating mode;
controlling the work machine in the performance operating mode at a first throttle position of the throttle control, a first transmission ratio, and a current machine speed;
detecting a change in a position of the user control from the performance operating mode to the economy mode;
determining a current rimpull of the work machine with the control system at the current machine speed, the current rimpull being a function of least a pressure drop across the motor, a motor displacement, a drivetrain ratio, an efficiency of the drivetrain or motor, a final drive windage factor, and a rolling radius;
determining an available rimpull at the current machine speed by the control system;
comparing a ratio by the control system of the current rimpull and the available rimpull to a rimpull threshold;
communicating a new throttle command by the transmission controller to an engine controller based on the ratio; and
adjusting the transmission ratio based on whether the ratio satisfies the rimpull ratio;
wherein, if the ratio satisfies the rimpull threshold, the transmission ratio is increased; wherein, if the ratio does not satisfy the rimpull threshold, the throttle command is increased and the transmission ratio is decreased.

19. The method of claim 18, wherein the detecting step comprises detecting the position of user control in a first economy mode or a second economy mode, where in the first economy operating mode the second transmission ratio comprises a forward or reverse ratio and in the second economy operating mode the second transmission ratio comprises only a reverse ratio.

20. The method of claim 18, further comprising:
storing a rimpull curve in a controller of the control system, the rimpull curve providing a plurality of available rimpull values as a function of machine speed; and
determining by the control system the ratio of current rimpull to the available rimpull from the rimpull curve.

* * * * *